United States Patent
Benes (10) Patent No.: US 11,438,599 B2
(45) Date of Patent: *Sep. 6, 2022

(54) VIDEO COMPRESSION FOR VIDEO GAMES

(71) Applicant: Electronic Arts Inc., Redwood City, CA (US)

(72) Inventor: Laurent Benes, Saint Cyr au Mont (FR)

(73) Assignee: Electronic Arts Inc., Redwood City, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 16/941,960

(22) Filed: Jul. 29, 2020

(65) Prior Publication Data

US 2020/0359030 A1 Nov. 12, 2020

Related U.S. Application Data

(63) Continuation of application No. 16/364,299, filed on Mar. 26, 2019, now Pat. No. 10,742,992.

(51) Int. Cl.
*H04N 19/186* (2014.01)
*H04N 19/156* (2014.01)
*H04N 19/177* (2014.01)
*H04N 19/115* (2014.01)

(52) U.S. Cl.
CPC ........ *H04N 19/156* (2014.11); *H04N 19/115* (2014.11); *H04N 19/177* (2014.11); *H04N 19/186* (2014.11)

(58) Field of Classification Search
None
See application file for complete search history.

(56) References Cited

U.S. PATENT DOCUMENTS

| | | | |
|---|---|---|---|
| 6,907,075 B2 | 6/2005 | Felts et al. | |
| 6,959,110 B1 | 10/2005 | Danskin et al. | |
| 10,742,992 B1* | 8/2020 | Benes | H04N 19/27 |
| 2007/0269115 A1 | 11/2007 | Wang et al. | |
| 2009/0041120 A1 | 2/2009 | Yu | |
| 2009/0046207 A1 | 2/2009 | Salvucci | |
| 2009/0315905 A1 | 12/2009 | Lu et al. | |
| 2010/0189183 A1 | 7/2010 | Gu et al. | |
| 2014/0092960 A1 | 4/2014 | MacInnis et al. | |
| 2014/0327668 A1 | 11/2014 | Strom et al. | |

(Continued)

*Primary Examiner* — Christopher G Findley
(74) *Attorney, Agent, or Firm* — Lee & Hayes, P.C.

(57) ABSTRACT

A video compression system and method may be used to compress video data using both resolution compression and texture compression. The compression may involve converting the video format from a first format to a second format and then performing resolution compression across blocks of pixels within each frame of the video. The resolution compressed data may then be arranged as data triplets spanning three consecutive frames of the video. The data triplets may be texture compressed using ETC or other texture compression techniques. The compressed video may be part of other applications, such as a video to be played within a video game. A client device may be able to decompress the compressed video by reversing the texture compression, reversing the resolution compression, and performing a format conversion to generate uncompressed video data that can be used to play the video.

20 Claims, 8 Drawing Sheets

(56) References Cited

U.S. PATENT DOCUMENTS

| | | |
|---|---|---|
| 2016/0205399 A1 | 7/2016 | Walls |
| 2016/0261884 A1 | 9/2016 | Li et al. |
| 2016/0379057 A1 | 12/2016 | Katsavoundidis |
| 2017/0024905 A1 | 1/2017 | Wang et al. |
| 2017/0054976 A1 | 2/2017 | Li et al. |
| 2017/0201758 A1 | 7/2017 | Moguillansky et al. |
| 2017/0358051 A1 | 12/2017 | Heynen et al. |
| 2018/0020223 A1 | 1/2018 | King |
| 2018/0122101 A1 | 5/2018 | Appu et al. |
| 2018/0176594 A1 | 6/2018 | Zhang et al. |
| 2018/0288441 A1 | 10/2018 | Zhang et al. |
| 2018/0315196 A1 | 11/2018 | Socek et al. |
| 2019/0014298 A1 | 1/2019 | Ramasubramonian et al. |
| 2019/0364205 A1 | 11/2019 | Wozniak et al. |

\* cited by examiner

STARTING VIDEO DATA: $R_{M,1}, G_{M,1}, B_{M,1}, R_{M,2}, G_{M,2}, B_{M,2}, ... R_{M+2,4}, G_{M+2,4}, B_{M+2,4}$

CONVERTED VIDEO DATA: $Y_{M,1}, Co_{M,1}, Cg_{M,1}, Y_{M,2}, Co_{M,2}, Cg_{M,2}, ... Y_{M+2,4}, Co_{M+2,4}, Cg_{M+2,4}$

RESOLUTION COMPRESSED VIDEO DATA: $Y_{M,1}, Y_{M,2}, Y_{M,3}, Y_{M,4}, Co_M, Cg_M, Y_{M+1,1}, Y_{M+1,2}, Y_{M+1,3}, Y_{M+1,4}, Co_{M+1}, Cg_{M+1}, Y_{M+2,1}, Y_{M+2,2}, Y_{M+2,3}, Y_{M+2,4}, Co_{M+2}, Cg_{M+2}$

RESOLUTION COMPRESSED TRIPLETS: $[Y_{M,1}, Y_{M+1,1}, Y_{M+2,1}], [Y_{M,2}, Y_{M+1,2}, Y_{M+2,2}], [Y_{M,3}, Y_{M+1,3}, Y_{M+2,3}], [Y_{M,4}, Y_{M+1,4}, Y_{M+2,4}], [Co_M, Co_{M+1}, Co_{M+2}], [Cg_M, Cg_{M+1}, Cg_{M+2}]$

FINAL COMPRESSED VIDEO DATA: $[Y_{M,1}, Y_{M+1,1}, Y_{M+2,1}]^*, [Y_{M,2}, Y_{M+1,2}, Y_{M+2,2}]^*, [Y_{M,3}, Y_{M+1,3}, Y_{M+2,3}]^*, [Y_{M,4}, Y_{M+1,4}, Y_{M+2,4}]^*, [Co_M, Co_{M+1}, Co_{M+2}]^*, [Cg_M, Cg_{M+1}, Cg_{M+2}]^*$

VIDEO COMPRESSION FOR VIDEO GAMES

CROSS REFERENCE TO RELATED APPLICATIONS

This application is a continuation of U.S. patent application Ser. No. 16/364,299 filed Mar. 26, 2019, which is incorporated herein by reference in its entirety.

BACKGROUND

Video gaming allows for players to play a variety of electronic games on client devices, such as video game consoles or smartphones. The video games often have video segments to be played within the video game on the client device. In some cases, these video segments are provided to the client device as part of a video game, such as via a network connection or on discretely sold media, such as CD-ROM disc media. Regardless of how the video segments are provided to the client device, playing the video may be a processing burden for the processor(s), such as the central processing unit (CPU), of the client device. In some cases, the video segments may further pose a storage burden on the client device, particularly on client devices with a relatively small form factor and/or limited storage capacity, such as a smartphone.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Example embodiments of this disclosure describes methods, apparatuses, computer-readable media, and system(s) for compressing and/or decompressing video, such as short video clips that may be incorporated in video games. The compression algorithms, as described herein, may compress video data of a video across pixels within a frame of the video, as well as across sequential frames of the video. The compressed video, as disclosed herein, may require less storage space, such as solid-state memory space to store and/or reduced bandwidth to transmit over a communications network, such as the Internet. Additionally, the compression algorithms, as disclosed herein, may lend themselves to hardware-based and/or graphical processing unit (GPU) or other secondary processing unit-based decompression, freeing up a primary processing unit for other tasks.

Videos may normally be encoded with one byte (8 bits) per color (red, green, and blue) per pixel per frame of a video. In other words, a relatively short video clip that is 480×200 pixels and include 100 frames may be encoded using 230 megabits (Mbits) of data. In some cases, this magnitude of storage may be excessive, especially in an application like a video game, where there may be many embedded videos and the applications may be run on relatively compact format client devices, like smartphones that may have limited electronic storage capabilities. The video compression algorithms, as disclosed herein, may allow for encoding video pixels with as little as 2 bits per pixel. Thus, the example video discussed above may be encoded with 19 Mbits of data, resulting in significant savings in storage and/or bandwidth requirements. Additionally, the compression algorithms, as disclosed herein, may result in little or no perceptible diminishment in the quality of the videos.

According to example embodiments, video compression of a video that is in red, green, blue (RGB) format may include converting the video to a different format, such as YCoCg color model. This type of a color model transformation may be accomplished by color model conversion algorithms, such as by performing matrix manipulation of the original RGB pixel values. Although this disclosure discusses the compression algorithm in the context of a YCoCg format, it should be understood that other formats may also be used to in the disclosed compression algorithm, such as YCbCr format, YCoCg-R format, any YCC format, YUV format, or the like.

When the video data is converted from RGB, where one byte (8 bits) may be allocated to each color (red, green, and blue) channel, to YCoCg, one byte may be used to define luminance (Y), chrominance orange (Co), and chrominance green (Cg). In the YCoCg format, reducing the resolution of the Co and Cg channels may be less noticeable to a human eye than reductions in resolution of Y.

According to example embodiments of the disclosure, the YCoCg format video may be compressed, at least partially in resolution. For example, a block of a pixels (e.g., 2×2 block of pixels) within each frame of the video may be defined by a single Co value. Similarly, the block of pixels may be defined by a single Cg value. Thus, in a 4 pixel (2×2 block of pixels) the 8 bytes that would be used to define the 4 pixels in Co and Cg may be reduced to just 2 bytes to define a single Co and Cg for the block by way of resolution compression. Since the Y channel is more noticeable by a human, the Y channel may not be resolution reduced, or at least not to the same extent as the Co and Cg channels. As described herein, the pixels of the frames may be resolution reduced for the Co and Cg data for each of the pixels and for each of the frames of a video to be compressed.

In example embodiments, when the pixels of the video have been format converted and resolution compressed, the resolution compressed pixel data may be arranged in triplets spanning across frames of the video. For example, Co data, as representing a block of pixels by way of resolution compression, may be arranged as a triplet across three consecutive frames of the video to be compressed. In this way, each of the Y (uncompressed), Co (resolution compressed), and Cg (resolution compressed) data for the video may be arranged as triplets across frames of the video to be compressed. These triplets may, in example embodiments, may simulate RGB channels of a video.

After arranging the Y, compressed Co, and compressed Cg data of the video as triplets, the triplets may be subjected to texture compression. Any suitable type of texture compression may be used, such as Ericson Texture Compression 1 (ETC1) and/or Ericson Texture Compression 2 (ETC2). The ETC1/ETC2 compression algorithms, as well as the corresponding decompression algorithms, may be performed efficiently. In some cases, ETC1/ETC2 compression algorithms may be supported by and performed on hardware, such as on a graphical processing units (GPUs) that are optimized for the ETC algorithms. This may allow for efficient texture compression and/or texture decompression, without using a lot of CPU or primary processor bandwidth. The ETC1/ETC2 algorithms may be well suited to perform the texture compression and/or decompression on graphics data that is arranged in triplets (e.g., emulating the R, G, and B channels of RGB encoded data).

The texture compression may result in reducing the bit requirement of the Y, compressed Cg, and compressed Co data in half (e.g., 4 bits versus 8 bits). As a result, each data triplet may be represented by 12 bits. At this point, the texture compressed data may be arranged (e.g., concatenated with each other) in order as the compressed video data of the compressed video. At this point, the video may be represented by as few as 2 bits per pixel per frame of the compressed video.

Example embodiments may also be applied to cases where the starting uncompressed video is in RGB-A format, where the uncompressed video includes alphacompositing and/or blending information for each of the pixels (e.g., A data). The A data may be preserved during format conversion from RGB-A to YCoCg format. The A data may not be resolution compressed, similar to the Y data. The A data may also be arranged in triplets for a particular pixel across three consecutive frames of the video, and then applied to texture compression (e.g., ETC1/ETC2 compression). In this case, the compression of RGB-A video may result in 3.33 bits per pixel per frame in the compressed video.

The compressed video may be more efficiently stored, particularly on client devices, such as smartphones, that may have limited storage capacity and/or memory. Additionally, if the compressed video is transported via a network (e.g., the Internet), then reduced bandwidth may be needed to transmit the compressed video. It should also be appreciated that the compression as described herein, while lossy, may result in a relatively high quality compressed video. The luminance qualities (e.g., Y data) of the video, that are more perceptible by humans, are uncompressed or not compressed to the same magnitude from a resolution standpoint as color qualities (e.g., Co data, Cg data) of the pixels of the video. In this way, the data losses from the video compression may result in imperceptible or relatively low perceptibility in any reduction of video quality.

The decompression algorithms, as may be performed by a client device, may be reverse operations of the compression operations as described herein. The compressed video may be received by the processing unit (e.g., GPU) of the client device. The client device may next arrange the compressed video data in triplets and perform a texture decompression algorithm (e.g., ETC1/ETC2 decompression). The texture decompressed data may then be arranged as Y, Co, and Cg data for each pixel for each frame of the video. This process may include replicating the Co and Cg data for each of the pixels of a block of pixels for which a unitary Co and Cg data was assigned during the resolution compression process during video compression. For example, if the Co and Cg resolution compression was performed on 2×2 blocks of pixels, then each of the pixels of the 2×2 block (4 pixels) may be assigned the Co and Cg values for that block. In this way, each pixel of each frame of the video will have corresponding Y data, Co data, and Cg data. Next, the YCoCg video data may be converted to RGB video data and played using a video player that plays uncompressed RGB video.

Although examples in the realm of video games and online gaming are discussed herein, it should be understood that the video compression and video decompression mechanisms, as described herein, may be applied to any variety of video applications. Indeed, without providing an exhaustive list of applications, the video compression algorithms and video decompression algorithms, may be applied to any suitable type of embedded video, streamed video, stored video, etc.

It should be understood that the systems and methods, as discussed herein, are technological improvements in the field of video technology. For example, the methods and systems as disclosed herein enables computing resources for improved video play, such as in video games, by more efficiently utilizing video storage, video processing, and/or video playback resources. These improvements manifest in more efficient computing resource utilization, such as storage usage, processor bandwidth usage, and/or network bandwidth usage. Additionally, the improvements in video technology, as disclosed herein, may allow for the inclusion of more and/or more detailed embedded videos, such as in video games. Thus, the disclosure herein provides improvements in the functioning of computers to provide improvements in the technical field of video compression and embedded video applications, such as video games. Additionally, the technological problems addressed here are ones that arise in the computer-era and the Internet-era, such as in the fields of online gaming and video games. Thus, not only is the disclosure directed to improvements in computing technology, but also to a variety of other technical fields related to video gaming.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

Figure 1:
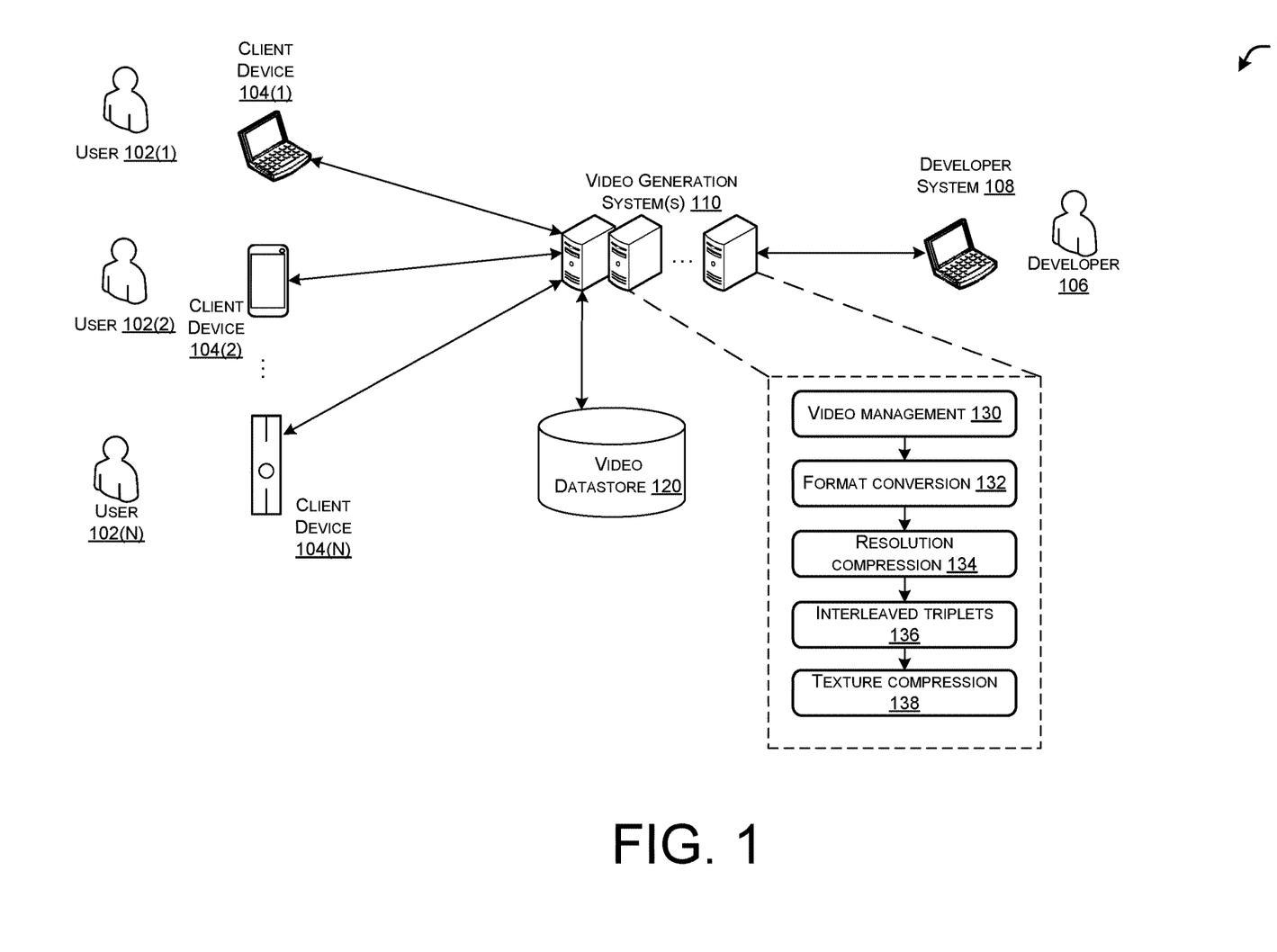
FIG. 1 illustrates a schematic diagram of an example environment with video generation system(s) to generate and provide video to one or more client system(s), in accordance with example embodiments of the disclosure.

FIG. 1 illustrates a schematic diagram of an example environment 100 with video generation system(s) 110 to generate and provide video to one or more client device(s) 104(1), 104(2), . . . 104(N), in accordance with example embodiments of the disclosure. The example environment 100 may include one or more user(s) 102(1), 102(2), . . . 102(N), hereinafter referred to individually or collectively as user 102 or users 102, who may interact with their respective client device(s) 104(1), 104(2), . . . 104(N), hereinafter referred to individually or collectively as client device 104 or client devices 104.

The client devices 104 may be configured to render content associated with videos, such as compressed videos, as disclosed herein. The client devices 104 may operate to decompress videos, compress videos, play compressed videos, and/or play compressed videos as part of another application, such as a video game with an embedded video. The videos, as decompressed and/or rendered by the client devices 104 may include a series of frames of images, that when displayed in sequence by the client device 104, such as by using a video application, the sequence of images appear as a video or moving pictures. In some cases, the video content rendered by the client devices 104 may also include audio.

The client device(s) 104 may receive a compressed video having compressed video data from the one or more video generation system(s) 110 to decompress and/or display to a user 102. The compressed video data may be received via any suitable medium, such as the Internet, other electronic network connections, storage media, or the like. The client device 104 may be configured to store the compressed video data of the compressed video locally, such as on a storage device (e.g., memory card, solid state memory, hard disk drive, etc.) of the client device 104.

The client device(s) 104 may be any suitable device, including, but not limited to a smartphone, a laptop computer, Sony Playstation® line of systems, a Microsoft Xbox® line of systems, any gaming device manufactured by Sony, Microsoft, Nintendo, an Intel-Architecture (IA)® based system, an Apple Macintosh® system, a netbook computer, a notebook computer, a desktop computer system, a set-top box system, a handheld system, a personal digital assistant, combinations thereof, or the like. In general, the game client device(s) 104 may execute programs thereon to interact with the video generation system(s) 110 to receive compressed video files from the video generation system(s) 110. Additionally, the client device(s) 104 may decompress compressed video and/or play the compressed video. As discussed herein, the compressed video, as decompressed and/or played by the client device(s) 104, may be embedded within other applications, such as video games.

The client device(s) 104 may be configured to provide a variety of functions such as texture decompression, format conversion, and/or pixel data allocation that enables the decompression mechanisms as disclosed herein. In example embodiments, the client device(s) 104 may be configured to receive the compressed video in any suitable form. The client device(s) 104 may be configured to decompress the compressed video in a secondary, or otherwise nonprimary processor, such as a graphical processor unit (GPU).

The video generation system(s) 110 may be configured to generate a video and/or compress a video, such as a free-standing video and/or a video that may be embedded in another application, such as a video game. The video generation system(s) 110 may be configured to interact a developer system 108 or a developer 106 to generate, embed, and/or compress a video, according to the embodiments disclosed herein. The video generation system(s) 110 may be configured to manage a repository of uncompressed and/or compressed videos, such as video datastore 120. The video generation system(s) 10 may obtain and/or store uncompressed video in the video datastore 120. Additionally or alternatively, the video generation system(s) 110 may store compressed video, as compressed by the video generation system(s) 110 in the video datastore 120. The video generation system(s) 110 may also obtain and/or retrieve compressed video from the video datastore to embed in one or more other applications, such as a video game, and/or to send the compressed video to another entity, such as the one or more client device(s) 104.

The video generation system(s) 110 may be configured to perform a variety of functions related to video compression, as disclosed herein. The video generation system(s) 110 may be able to engage in video management 130, such as by generating, storing, compressing, retrieving, embedding, and/or transmitting videos and associated video data, both compressed and uncompressed. This may entail interacting with the video datastore 120 to manage the compressed and/or uncompressed videos, as well as with the developer system(s) 108 to generate, manage, and/or use videos, such as compressed videos, in other applications, such as video game applications.

The video generation system(s) 110 may be configured for format conversion 132, such as converting image and/or video data from any suitable format to any other suitable format. For example, the video generation system(s) 110 may be able to convert between RGB format, where red, green, and blue values corresponding to each pixel of each frame of a video is specified, and YCoCg format, where luminance, orange level, and green level is specified for each pixel of each frame of the video. Indeed, any suitable type of format conversion 132 may be performed by the video generation system(s) 110, such as between RGB, any type of YCC format, YUV format, or the like.

The video generation system(s) 110 may also be configured for resolution compression 134. Resolution compression 134 may involve ascribing a single data describing an attribute of more than one pixel. For example, more than one pixel, such as a 2×2 block (4 pixels), may have a single Co and/or Cg value representation thereof. In this way, multiple pixels may be represented by a single value for a particular attribute to reduce the number of data values, corresponding to bits of video data, needed to describe the pixels of the video to be compressed. While lossy, the resolution compression 134 may be applied to video data types (e.g., Co and/or Cg data) and at a level (e.g., resolution compression to a single Co and Cg data for a 2×2 block of pixels) that may be minimally perceptible to the human eye. When applying resolution compression 134 to a particular data type across several pixels, the data for those pixels may be any suitable representation of the original data of the non-resolution compressed pixels, such as an average value of the data, a median of the data, a selection of any one of the data, the least value of the data, the maximum value of the data, the mode of the data, or any other suitable mechanism for representing multiple data values of the pixels to be resolution compressed as a single data value.

The video generation system(s) 110 may be configured for generating interleaved triplets 136 of data that is to be applied to additional compression algorithms, such as texture compression 138. The interleaving may involve placing data, such as Y, Co, and/or Cg data, from consecutive frames of a video in a triplet. The three data values in the triplet may, in example embodiments, emulate the R, G, and B channels of an RGB format. This arrangement of data, as RGB emulated triplets, may be advantageous in performing certain types of texture compression 138.

The texture compression 138, as performed by the video generation system(s) 110, may include any variety of texture compression 138, such as Ericsson Texture Compression (ETC) 1, ETC2, S3 texture compression (S3TC), Adaptive Scalable Texture Compression (ASTC), combinations thereof, or the like. In some cases, the texture compression algorithms may compress 8 bits of data into 4 bits. The video generation system(s) may be able to apply ETC1 and/or ETC2 algorithms to data triplets that resemble RGB data channels, such as data triplets that correspond to three consecutive frames of a video to be compressed.

Figure 2:
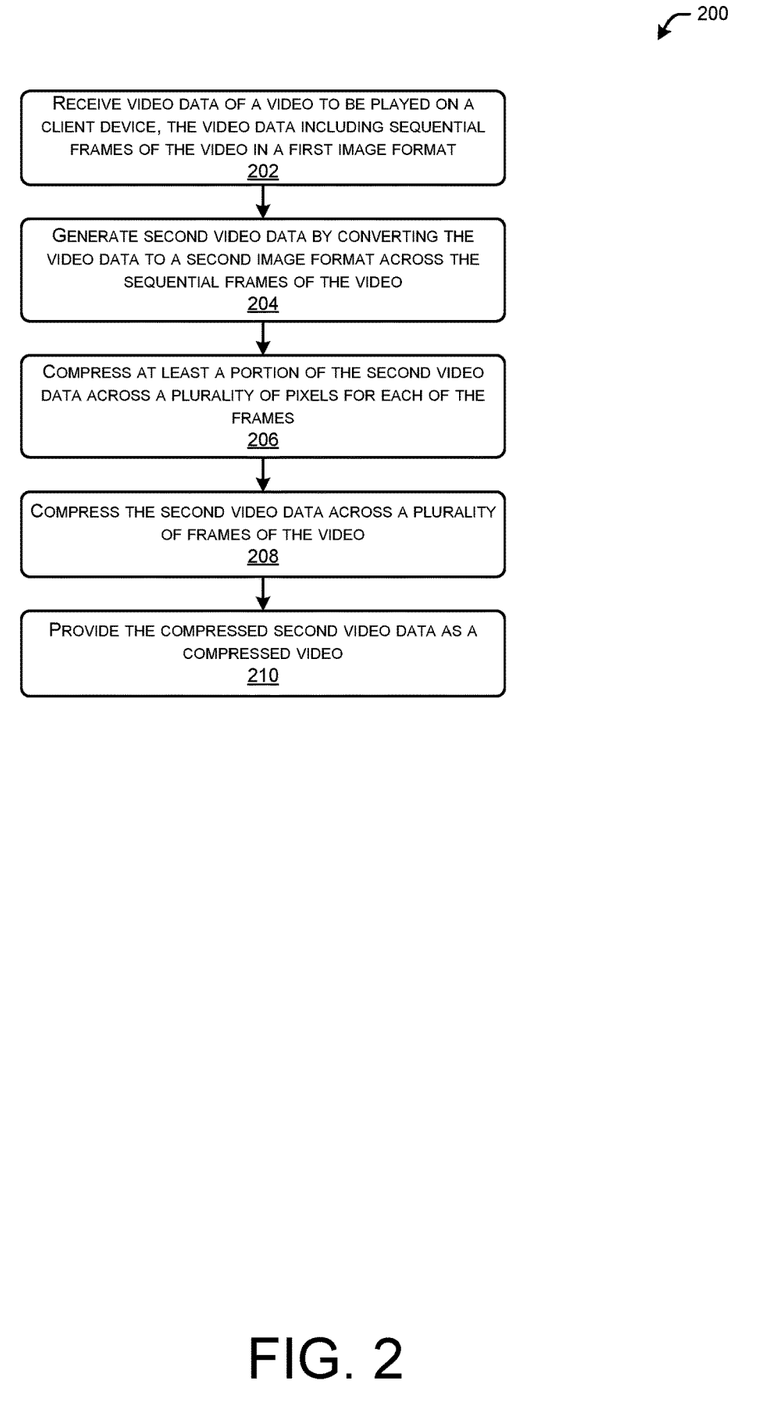
FIG. 2 illustrates a flow diagram of an example method by which a video may be compressed by the video generation system(s) of FIG. 1, in accordance with example embodiments of the disclosure.

FIG. 2 illustrates a flow diagram of an example method 200 by which a video may be compressed by the video generation system(s) 110 of FIG. 1, in accordance with example embodiments of the disclosure. The method 200 may be performed by the video generation system(s) 110, individually or in cooperation with one or more other elements of the environment 100.

At block 202, video data of a video to be played on a client device may be received, where the video data includes sequential frames and is in a first image format. The video may have any number of sequential frames, such as, for example, 100 frames or 782 frames. The video may be in any suitable starting format, such as for example RGB format, where each pixel across each frame of the video may be represented by 3 bytes (24 bits), where each byte represents a red value, a green value, and a blue value of each of the pixels of each of the frames. The frame of the video may be of any suitable size, such as 180×240 pixels, 480×240 pixels, high definition resolution, 4K resolution, or the like. In some cases, the starting video format may be RGB-A, where the uncompressed video includes alphacompositing and/or blending information for each of the pixels (e.g., A data). The A data, according to method 200 may be preserved when compressing the video.

At block 204, second video data may be generated by converting the video data to a second image format for each of the sequential frames of the video. For example, the video data may originally be in RGB format and may be converted to a YCC format, such as YCoCg format. This type of conversion may be performed using matrix-based transformation techniques. In some cases, secondary processors, such as a GPU, may be well-suited in performing this conversion.

At block 206, at least a portion of the second video data may be compressed across a plurality of pixels for each of the frames of the video. In other words, a grouping of pixels may be selected and at least a portion of the second video data may be compressed for that grouping of pixels by attributing a single data value for the grouping of pixels, rather than individual values for each of the pixels of the grouping of pixels. For example, a 2×2 block of pixels with 4 pixels may have a single Co data value and a single Cg data value associated therewith.

It should be noted that not all of the second video data is required to be resolution compressed within the plurality of pixels. For example, for the 2×2 block of pixels, while the Co data and Cg data may be resolution compressed, the Y data need not be resolution compressed. Thus, in this example, for the 2×2 block of pixels, after resolution compression, there may be a single resolution compressed Co data value and a single resolution compressed Cg data value for the 2×2 block of pixels, but there may be four Y data values corresponding to each of the four pixels of the 2×2 block of pixels. Thus, for this example 2×2 block, resolution compression may reduce the bit count of the 2×2 block from 96 bits (describing Y, Co, and Cg for each pixel) to 48 bits (describing Y for each pixel, and describing Co and Cg for the 2×2 block as a whole). Although a 2×2 block is discussed as an example, any suitable grouping of pixels may be applied to resolution compression, such as a 3×3 block or a 2×4 block, etc. According to example embodiments, all of the pixels within each of the frames may be resolution compressed for at least some video data (e.g., Co data, Cg data) according to groupings (e.g., blocks) of pixels.

At block 208, the second video data may be compressed across a plurality of frames of the video. In example embodiments, this compression across the plurality of frames may be a texture compression, such as ETC1, ETC2, or any suitable texture compression. The texture compression, as described herein, may be applied to resolution compressed video data, such as the resolution compressed Co data and the resolution compressed Cg data discussed above, or to video data that has not been compressed, such as the Y data discussed above.

In example embodiments, the video data (e.g., resolution compressed Co data, resolution compressed Cg data, Y data) may be arranged for particular pixels and/or blocks of pixels across a plurality of frames of the video. For example, resolution compressed Co data for a block of pixels, as generated according to the operations of block 206, may be arranged as along with resolution compressed Co data for the same block of pixels in two consecutive frames of the video as a resolution compressed Co triplet. This arrangement of video data, such as in triplets, may emulate the arrangement of R, G, and B data in an RGB format image or video file. Thus, this arrangement, in some cases, may be particularly efficient for application to texture compression and decompression algorithms. For example, ETC-type compression and/or decompression may be supported by GPU hardware in many computing systems, allowing the offloading of processing bandwidth from a primary processor (e.g., CPU) to a secondary processor (e.g., GPU). In example embodiments, after texture compression the bit count may be reduced by 50% (e.g., 8 bits of data may be represented by 4 bits by texture compression).

At block 210 the compressed second video data may be provided as a compressed video. The compressed video may be a compressed version of the original video. This compressed video, therefore, may be compressed using both resolution compression, as well as texture compression. Furthermore, the resolution compression may be applied to a subset of attributes and/or data (e.g., Co data and Cg data) for a collection of pixels. Further still, the compressed video data may be arranged in a manner where texture compressed data (e.g., texture compressed Y data, texture compressed Co data with resolution compression, and texture compressed Cg data with resolution compression) for a particular pixel is grouped across multiple consecutive frames (e.g., three frames) of the video.

In cases where the original video data is in RGB-A format, the alpha channel (A data) may be treated similarly to the Y data. In other words, the A data may not be resolution compressed, but be subjected to texture compression. As discussed above with respect to other video data, the A data may be arranged as A data triplets across three consecutive frames of the video and subject to ETC-type compression.

It should be noted that some of the operations of method 200 may be performed out of the order presented, with additional elements, and/or without some elements. Some of the operations of method 200 may further take place substantially concurrently and, therefore, may conclude in an order different from the order of operations shown above.

Figure 3:
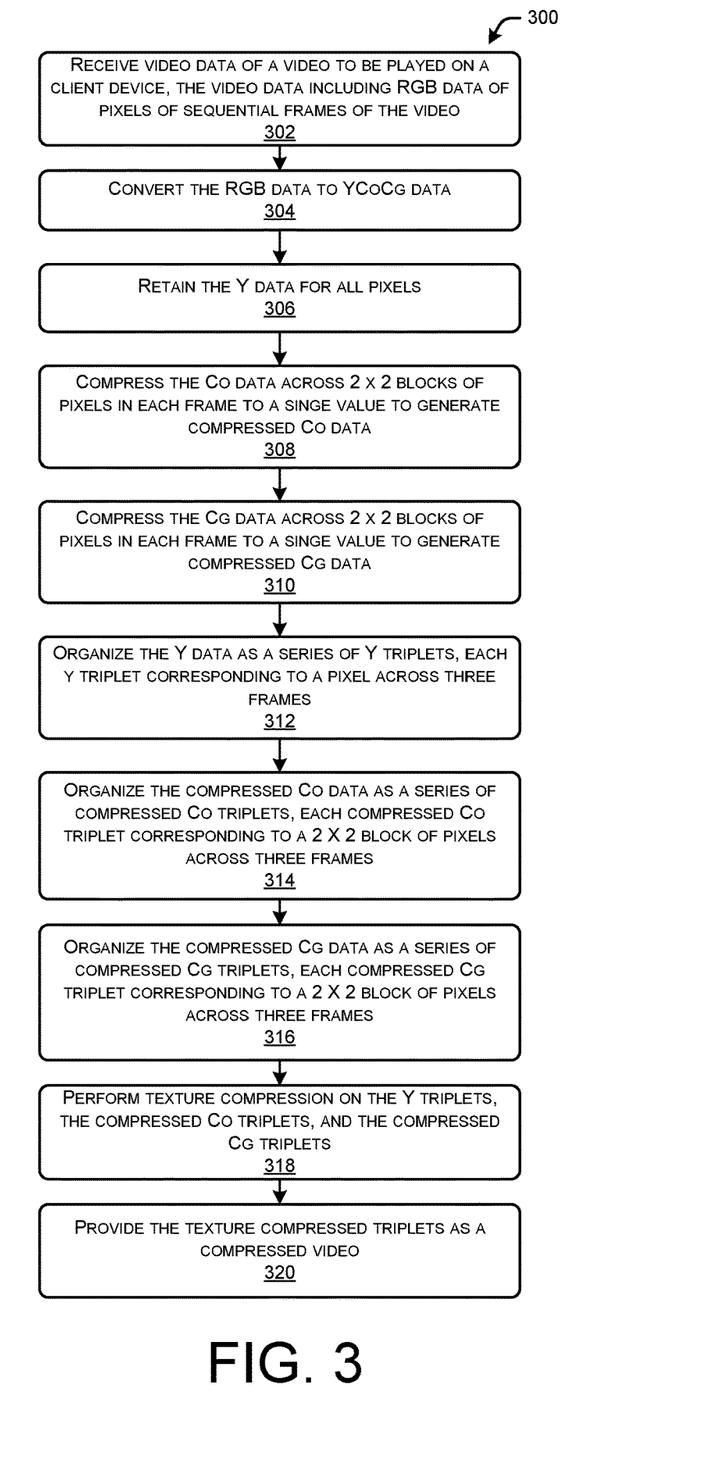
FIG. 3 illustrates a flow diagram of another example method by which a video may be compressed by the video generation system(s) of FIG. 1, in accordance with example embodiments of the disclosure.

FIG. 3 illustrates a flow diagram of another example method by which a video may be compressed by the video generation system(s) of FIG. 1, in accordance with example embodiments of the disclosure. The method 300 may be performed by the video generation system(s) 110, individually or in cooperation with one or more other elements of the environment 100. In some cases, method 300 may be a particular implementation of method 200 of FIG. 2.

At block 302, video data of a video to be played on a client device may be received, where the video data includes sequential frames in RGB format. The video may have any number of sequential frames, such as, for example, 128 frames or 1028 frames. The pixels of the video may be defined across each frame of the video by 3 bytes (24 bits), where each byte represents a red value, a green value, and a blue value for a pixel for each of the frames. The frame of the video may be of any suitable size, such as 180×240 pixels, 480×240 pixels, high definition resolution, 4K resolution, or the like.

At block 304, the RGB data of the video may be converted from RGB format to YCoCg data. This type of conversion may be performed using matrix-based transformation techniques. In some cases, secondary processors, such as a GPU, may be well-suited in performing this conversion.

At block 306, the Y data for all of the pixels across all of the frames of the video may be retained. In other words, the Y data may not be subject to any reduction in resolution. This may be because reduced luminance resolution of a pixel may be more perceptible to the human eye than reduced chrominance resolution of a pixel.

At block 308, the Co data across 2×2 blocks of pixels in each frame may be compressed to a single value to generate compressed Co data. In other words, within a frame of the video, the pixels may be grouped as 2×2 blocks and then these blocks may be subject to resolution compression with respect to the Co data of the pixels of each of the blocks. This resolution compression process may be performed for all of the blocks within the frame and for all of the frames of the video. Thus, a 2×2 block, after the resolution compression, may be described by a single resolution compressed Co data value, rather than four different Co data values corresponding to each of the four pixels of the block. Any suitable mechanism may be used to determine the resolution compressed Co data of a 2×2 block of pixels. For example, an average of the Co data of the individual pixels may be representative of the 2×2 block of pixels. Other mechanisms may include finding the median, using the low value, using the high value, using a mode, or indeed any other representative value of the Co data of the four pixels of the 2×2 block.

At block 310, the Cg data across the 2×2 blocks of pixels in each frame may be compressed to a single value to generate compressed Cg data. This process may be substantially similar to the operations of block 308. While the Co and Cg data may be resolution compressed, the Y data may not be resolution compressed.

At block 312, the Y data may be organized as a series of Y triplets, where each Y triplet corresponds to a pixel across three frames of the video. The three frames may be consecutive frames. Thus, each Y triplet may contain Y data for a pixel across three consecutive frames of the video. The Y triplet may emulate the R, G, and B channels of RGB data. In this way, the Y triplets may be easy to process via algorithms that may normally be applied to RGB data, such as ETC algorithms.

At block 314, the compressed Co data may be organized as a series of compressed Co triplets, where each compressed Co triplet corresponds to a 2×2 block of pixels across three frames of the video. This process may be similar to the operations of block 312. Each compressed Co triplet may contain compressed Co data for a 2×2 block across three consecutive frames of the video. At block 316, the compressed Cg data may be organized as a series of compressed Cg triplets, where each compressed Cg triplet corresponds to a 2×2 block of pixels across three frames of the video. This process may be similar to the operations of block 314, where each compressed Cg triplet may contain compressed Cg data for a 2×2 block across three consecutive frames of the video.

At block 318, texture compression may be performed on the Y triplets, the compressed Co triplets, the compressed Cg triplets. As discussed above, the texture compression may be of any suitable type, such as ETC1 or ETC2. The arrangement of the data as triplets may make the ETC algorithms particularly efficient. At block 320, the texture compressed triplets may be provided as a compressed video.

It should be noted that some of the operations of method 300 may be performed out of the order presented, with additional elements, and/or without some elements. Some of the operations of method 300 may further take place substantially concurrently and, therefore, may conclude in an order different from the order of operations shown above.

Figure 4:
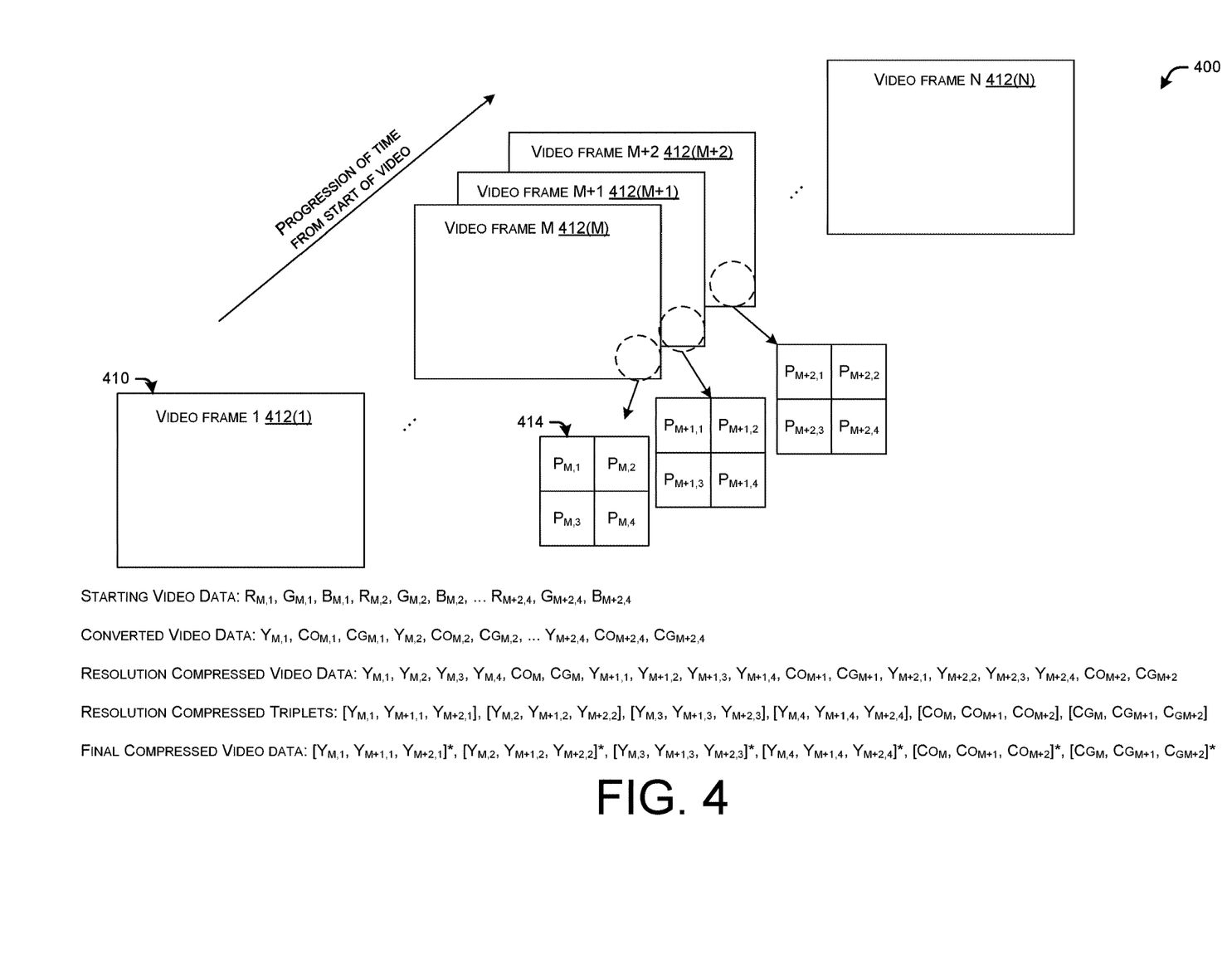
FIG. 4 illustrates a schematic diagram of a video compression mechanism, in accordance with example embodiments of the disclosure.

FIG. 4 illustrates a schematic diagram of a video compression mechanism 400, in accordance with example embodiments of the disclosure. A video 410 may include a sequence of frames 412(1), . . . , 412(M), 412(M+1), . . . , 412(N), hereinafter referred to individually or in plurality as frame 412 or frames 412. Each frame 412 may include pixels, denoted here as $P_{i,j}$, where i denotes a frame index, and j denotes a pixel index. A pixel grouping 414 may be a 2×2 grouping of the pixels within a particular frame 412 of the video 410.

The video 410 may have starting video data in an RGB format, where $R_{i,j}$, indicates the $j^{th}$ pixel of the $i^{th}$ frame's red value. Similarly, $G_{i,j}$ indicates the $j^{th}$ pixel of the $i^{th}$ frame's green value and $B_{i,j}$ indicates the $j^{th}$ pixel of the $i^{th}$ frame's blue value. After performing a format conversion, converted video data may be generated. The converted video data may include data in the form of $Y_{i,j}$, which indicates the $j^{th}$ pixel of the $i^{th}$ frame's luma value. Similarly, $Co_{i,j}$ indicates the $j^{th}$ pixel of the $i^{th}$ frame's orange chroma value and $Cg_{i,j}$ indicates the $j^{th}$ pixel of the $i^{th}$ frame's green chroma value. After resolution compression, each of the $Y_{i,j}$ data may be retained, while the $Co_{i,j}$ and the $Cg_{i,j}$ data may be compressed to one value per block, indicated as $Co_i$ and $Cg_i$, as the chroma orange value and the chroma green value of the shown block 414 of the $i^{th}$ frame, respectively.

The resolution compressed triplets may be generated as an arrangement of the Y values for each pixel of the 2×2 block 414 and the resolution compressed Co data and the resolution compressed Cg data for the block 414 across three frames 412(M), 412(M+1), 412(M+2). For example, the Y triplet corresponding to pixels $P_{M,1}$, $P_{M+1,1}$, and $P_{M+2,1}$ may be denoted as $[Y_{M,1}, Y_{M+1,1}, Y_{M+2,1}]$. Similarly, the resolution compressed Co triplet and resolution compressed Cg triplet for the 2×2 block 414 may be denoted as $[Co_M, Co_{M+1}, Co_{M+2}]$ and $[Cg_M, Cg_{M+1}, Cg_{M+2}]$, respectively. The final compressed video data may be denoted with a "*" to indicate texture compression performed on a triplet, such as $[Y_{M,1}, Y_{M+1,1}, Y_{M+2,1}]$* or $[Cg_M, Cg_{M+1}, Cg_{M+2}]$*.

Figure 5:
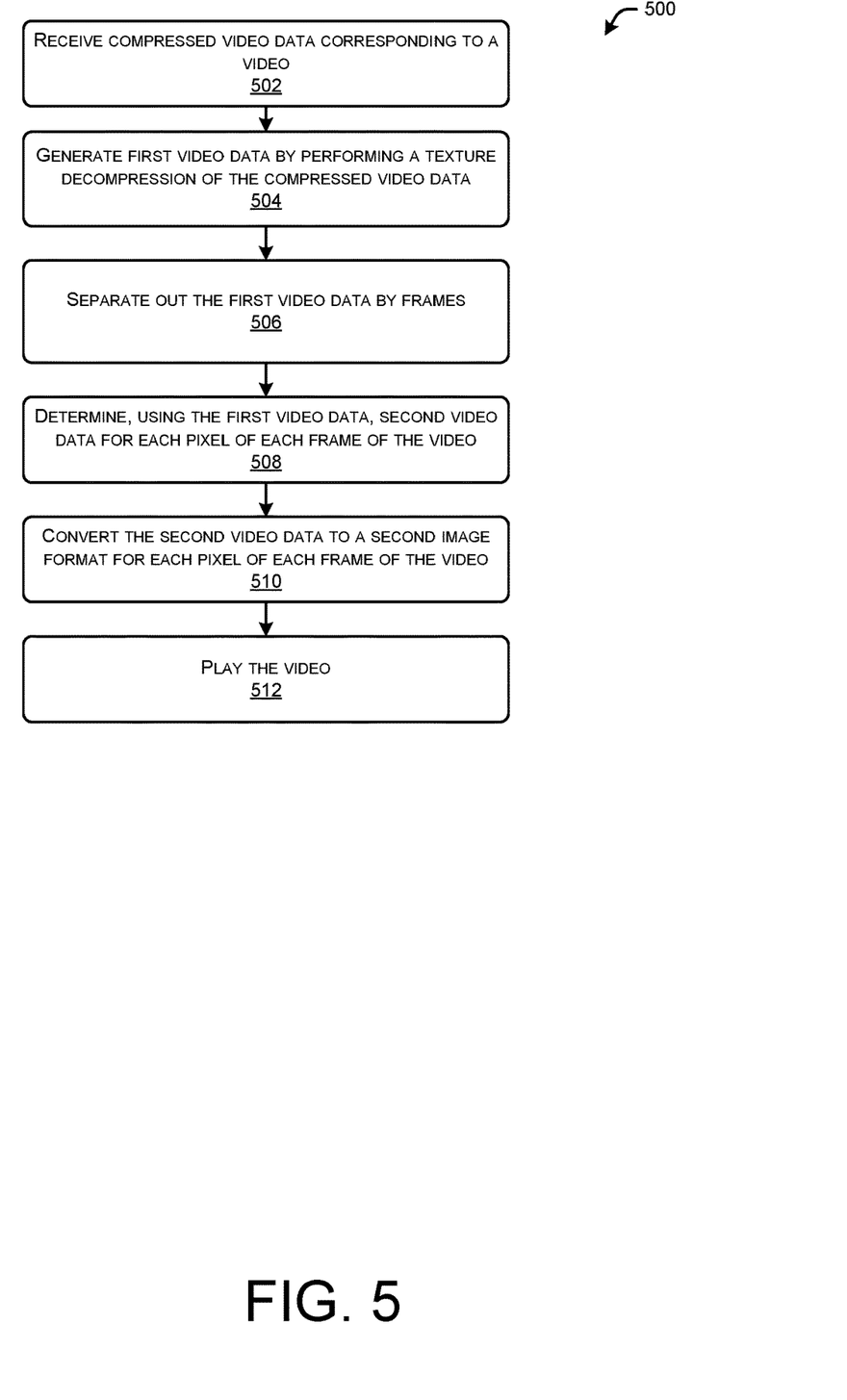
FIG. 5 illustrates a flow diagram of an example method to decompress a video by a client system of FIG. 1, in accordance with example embodiments of the disclosure.

FIG. 5 illustrates a flow diagram of an example method to decompress a video by a client system of FIG. 1, in accordance with example embodiments of the disclosure. The method 500 may be performed by the client device 104, individually or in cooperation with one or more other elements of the environment 100.

At block 502, compressed video data corresponding to a video may be received. As discussed above, this compressed video data may, in some cases, be received as part of another application, such as a video game. The compressed video data may be of the form as described with reference to FIGS. 2, 3, and 4 above. In other words, the compressed video data may be texture compressed (e.g., ETC) and resolution compressed (e.g., 25% resolution for Co and Cg components of the video data).

At block 504, first video data may be generated by performing a texture decompression of the compressed video data. This may involve reversing any type of texture compression, such as ETC, that was performed when compressing the video data, such as by the methods 200 of FIG. 2 or method 300 of FIG. 3. The result of the texture decompression may be Y triplets corresponding to pixels across three consecutive frames of the video, resolution compressed Co triplets corresponding to blocks across three consecutive frames of the video, and resolution compressed Cg triplets corresponding to the blocks across three consecutive frames of the video.

At block 506, the first video data may be separated out by blocks. In this case, the compressed Co data and the compressed Cg data for a block may be attributed to each of pixels of the block. For example, for 2×2 blocks of pixels, this may result in a 4× expansion of data, as a value for a particular block is replicated for each of the four pixels of that block.

At block 508, second video data may be determined, using the first video data, for each pixel of each frame of the video. The second video data may be a rearrangement of the first video data by ascribing a Y, Co, and Cg value to each of the pixels of the video of each of the frames.

At block 510, the second video data may be converted to a second image format for each pixel of each frame of the video. This may involve conversion from a YCoCg format to an RGB format for all of the pixels of all of the frames of the video. At block 512, the video may be played. Playing the video may be optional and, instead, the uncompressed video may be stored in an uncompressed state to be played at a later time.

It should be noted that some of the operations of method 500 may be performed out of the order presented, with additional elements, and/or without some elements. Some of the operations of method 500 may further take place substantially concurrently and, therefore, may conclude in an order different from the order of operations shown above.

Figure 6:
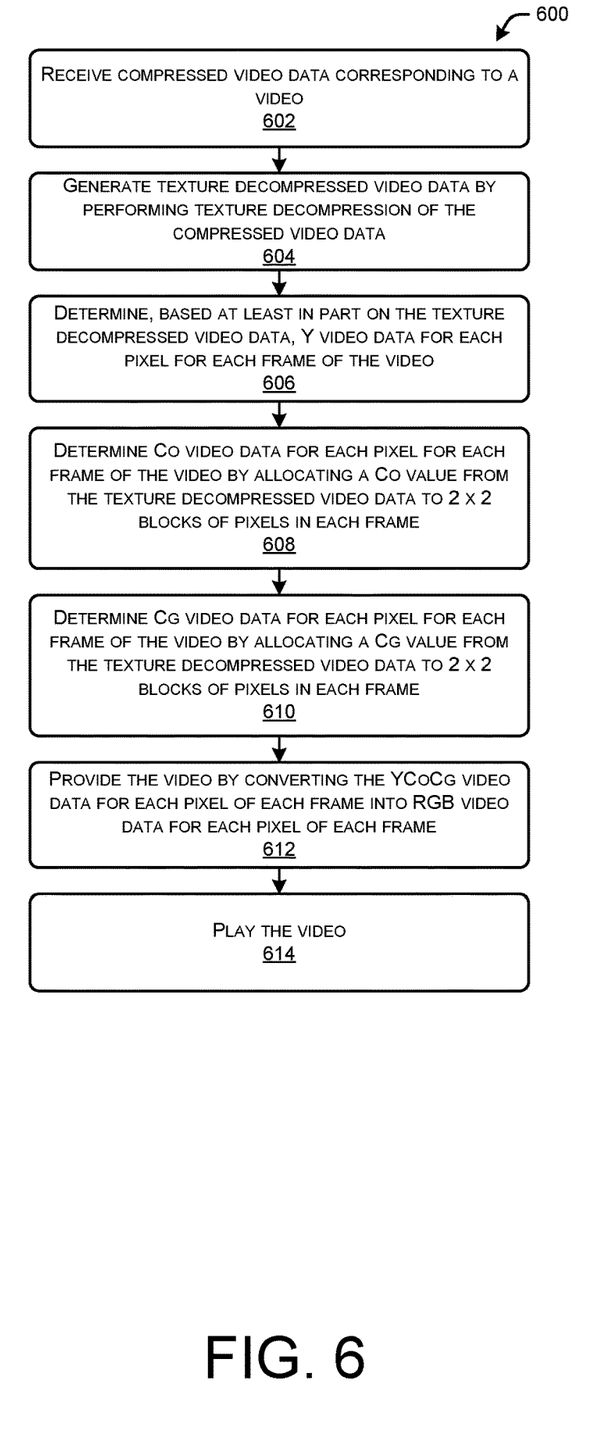
FIG. 6 illustrates a flow diagram of another example method to decompress a video by a client system of FIG. 1, in accordance with example embodiments of the disclosure.

FIG. 6 illustrates a flow diagram of another example method 600 to decompress a video by a client system of FIG. 1, in accordance with example embodiments of the disclosure. The method 600 may be performed by the client device 104, individually or in cooperation with one or more other elements of the environment 100.

At block 602, compressed video data corresponding to a video may be received. As discussed above, this compressed video data may, in some cases, be received as part of another application, such as a video game.

At block 604, texture decompressed video data may be generated by performing a texture decompression of the compressed video data. The result of the texture decompression may be Y triplets corresponding to pixels across three consecutive frames of the video, resolution compressed Co triplets corresponding to blocks across three consecutive frames of the video, and resolution compressed Cg triplets corresponding to the blocks across three consecutive frames of the video.

At block 606, Y video data may be determined for each pixel for each frame of the video based at least in part on the texture decompressed video data. The Y video data may be determined from the Y triplets generated for each pixel across three consecutive frames of the video. For example, the Y data may be rearranged by frame.

At block 608, Co video data may be determined for each pixel for each frame of the video by allocating a Co value from the texture decompressed video data to 2×2 blocks of pixels in each frame. As discussed above, a resolution compressed Co value for each block may be allocated to each of the pixels of that block. Additionally, the Co data may be rearranged by frame, rather than across frames, as was performed during the compression process.

At block 610, Cg video data may be determined for each pixel for each frame of the video by allocating a Cg value from the texture decompressed video data to 2×2 blocks of pixels in each frame. A resolution compressed Cg value for each block may be allocated to each of the pixels of that block. Additionally, the Cg data may be rearranged by frame, rather than across frames, as was performed during the compression process. At block 612, the video data may be provided by converting the YCoCg video data for each pixel of each frame into RGB video data for each pixel of each frame.

At block 614, video may be played. Playing the video may be optional and, instead, the uncompressed video may be stored in an uncompressed state to be played at a later time.

It should be noted that some of the operations of method 600 may be performed out of the order presented, with additional elements, and/or without some elements. Some of the operations of method 600 may further take place substantially concurrently and, therefore, may conclude in an order different from the order of operations shown above.

Figure 7:
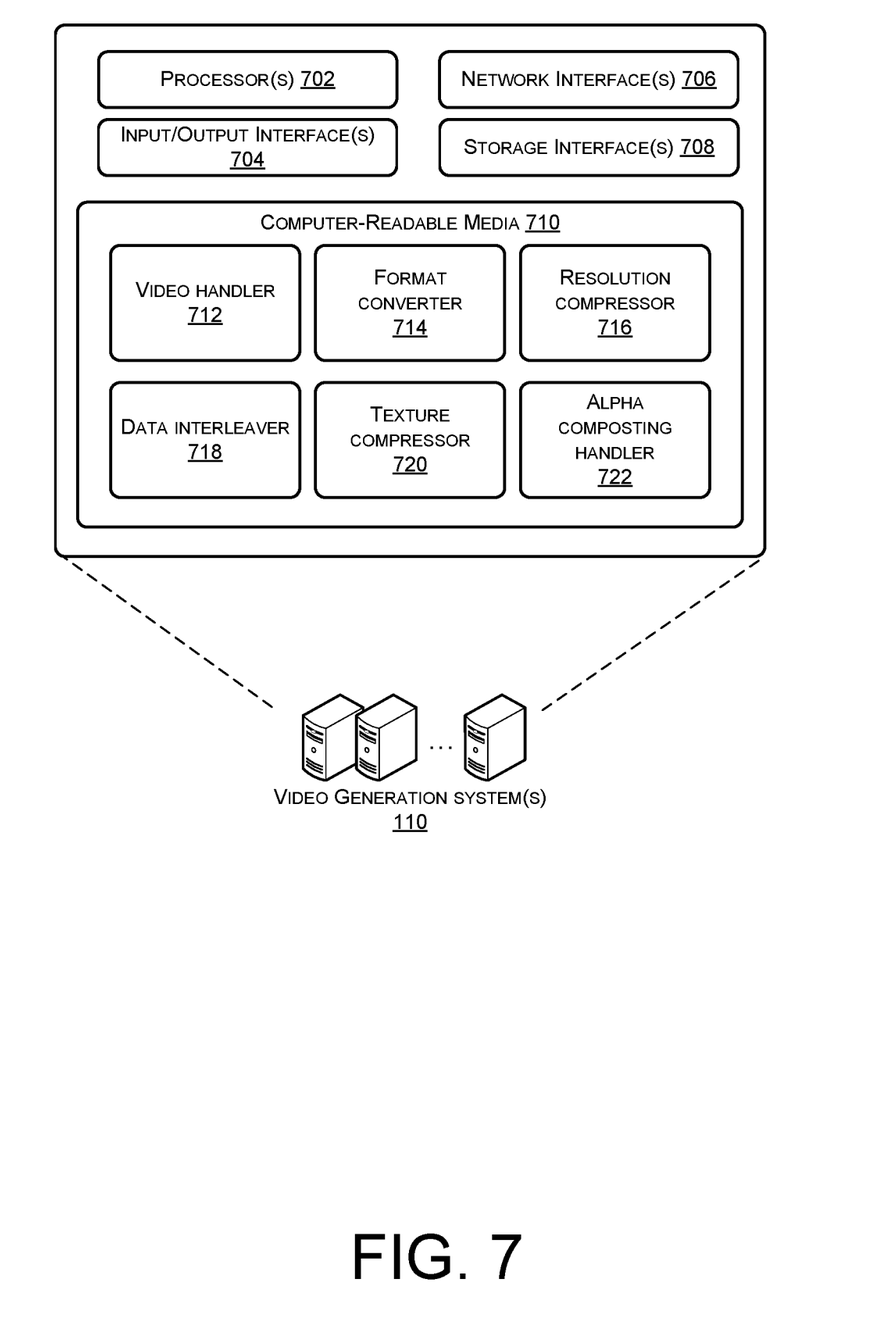
FIG. 7 illustrates a block diagram of an example video generation system that may compress a video, in accordance with example embodiments of the disclosure.

FIG. 7 illustrates a block diagram of an example video generation system(s) 110 that may compress a video, in accordance with example embodiments of the disclosure. The video generation system(s) 110 may include one or more processor(s) 700, one or more input/output (I/O) interface(s) 702, one or more communication interface(s) 704, one or more storage interface(s) 706, and computer-readable media 710.

In some implementations, the processors(s) 700 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 700 may possess its own local memory, which also may store program modules, program data, and/or one or more operating system(s). The one or more processor(s) 700 may include one or more cores.

The one or more input/output (I/O) interface(s) 702 may enable the video generation system(s) 110 to detect interaction with a user and/or other system(s. The I/O interface(s) 702 may include a combination of hardware, software, and/or firmware and may include software drivers for enabling the operation of any variety of I/O device(s) integrated on the video generation system(s) 110 or with which the video generation system(s) 110 interacts, such as displays, microphones, speakers, cameras, switches, and any other variety of sensors, or the like.

The network interface(s) 704 may enable the video generation system(s) 110 to communicate via the one or more network(s). The communications interface(s) 704 may include a combination of hardware, software, and/or firmware and may include software drivers for enabling any variety of protocol-based communications, and any variety of wireline and/or wireless ports/antennas. For example, the network interface(s) 704 may comprise one or more of a cellular radio, a wireless (e.g., IEEE 802.1x-based) interface, a Bluetooth® interface, and the like. In some embodiments, the network interface(s) 704 may include radio frequency (RF) circuitry that allows the video generation system(s) 110 to transition between various standards. The network interface(s) 704 may further enable the video generation system(s) 110 to communicate over circuit-switch domains and/or packet-switch domains.

The storage interface(s) 706 may enable the processor(s) 700 to interface and exchange data with the computer-readable medium 710, as well as any storage device(s) external to the video generation system(s) 110, such as the API log datastore 142.

The computer-readable media 710 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 710 may be implemented as computer-readable storage media (CRSM), which may be any available physical media accessible by the processor(s) 700 to execute instructions stored on the memory 710. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 700. The computer-readable media 710 may have an operating system (OS) and/or a variety of suitable applications stored thereon. The OS, when executed by the processor(s) 700 may enable management of hardware and/or software resources of the video generation system(s) 110.

Several functional blocks having instruction, data stores, and so forth may be stored within the computer-readable media 710 and configured to execute on the processor(s) 700. The computer readable media 710 may have stored thereon a video handler 712, a format converter 714, a resolution compressor 716, a data interleaver 718, a texture compressor 720, and an alpha compositing handler 722. It will be appreciated that each of the functional blocks 712, 714, 716, 718, 720, 722, may have instructions stored thereon that when executed by the processor(s) 700 may enable various functions pertaining to the operations of the video generation system(s) 110.

The instructions stored in the video handler 712, when executed by the processor(s) 700, may configure the video generation system(s) 110 to interact with a developer system 108 to generate, embed, store, retrieve, compress, and/or decompress a video. In some cases, the video generation system(s) 110 may organize, store, and/or retrieve uncompressed and/or compressed videos in the video datastore 120.

The instructions stored in the format converter 714, when executed by the processor(s) 700, may configure the video generation system(s) 110 to convert formats of video and/or image data. For example, the video generation system(s) 110 may be configured to convert video and/or image data from an RGB format to a YCoCg format, or vice-versa. The video generation system(s) 110 may also be able to convert video and/or image data to or from other formats, such as RGB-A, PNG, other YCC formats, YUV, or the like.

The instructions stored in the resolution compressor 716, when executed by the processor(s) 700, may configure the video generation system(s) 110 to compress portions of video data, such as Co data and/or Cg data across a block of pixels in resolution. The video generation system(s) 110 may determine a representative value of a video data across a grouping of pixels that is ascribed to all of the pixels in the grouping.

The instructions stored in the data interleaver 718, when executed by the processor(s) 700, may configure the video generation system(s) 110 to arrange video data, such as Y data, resolution compressed Co data, and/or resolution compressed Cg data across frames of the video, such as in triplets across three consecutive frames of the video.

The instructions stored in the texture compressor 720, when executed by the processor(s) 700, may configure the video generation system(s) 110 to perform texture compression including, but not limited to, ETC1 and/or ETC2.

The instructions stored in the alpha compositing handler 722, when executed by the processor(s) 700, may configure the video generation system(s) 110 to perform compression on alpha (A) data, when the initial video is in RGB-A format. The video generation system(s) 110 may arrange the A data across consecutive frames of the video and perform texture compression thereon.

Figure 8:
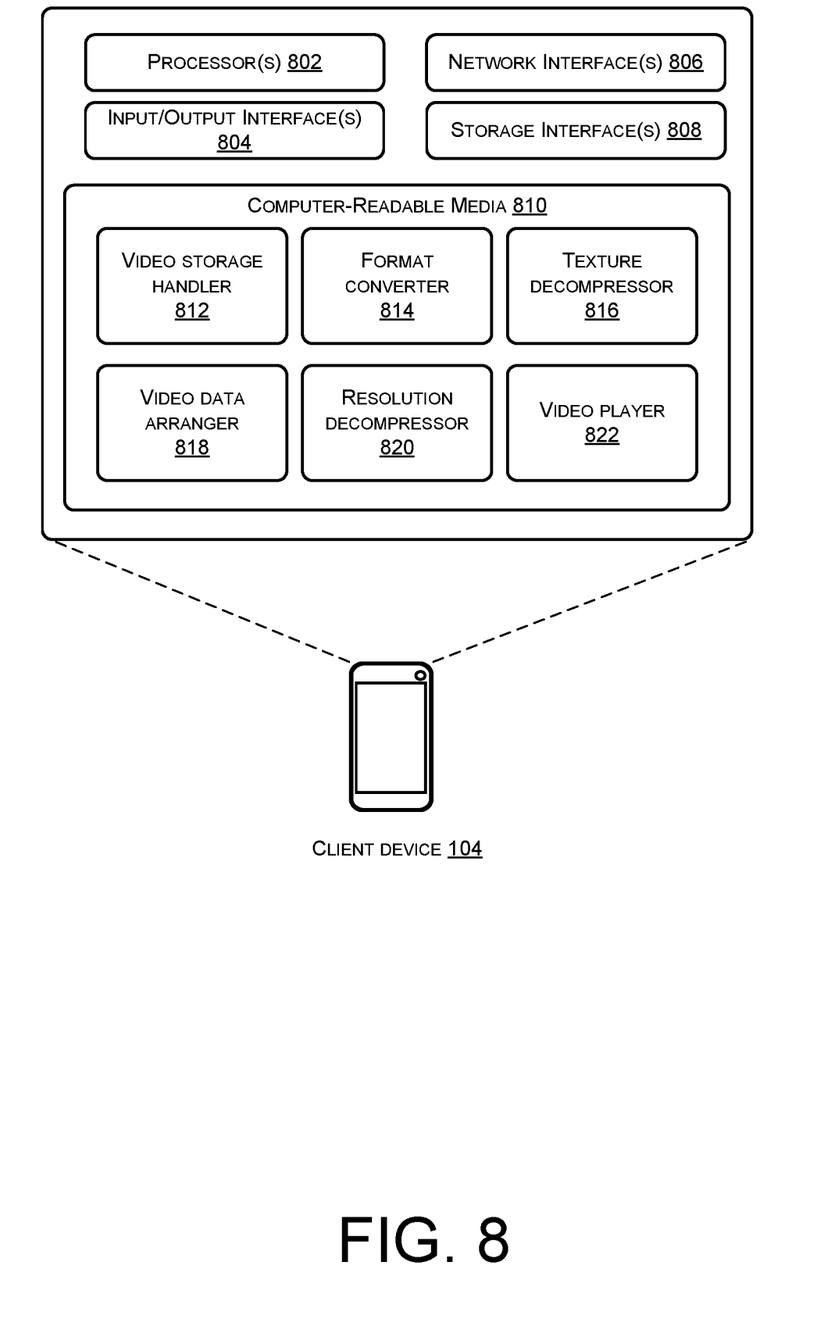
FIG. 8 illustrates a block diagram of an example client system that may decompress and/or play a video, in accordance with example embodiments of the disclosure.

FIG. 8 illustrates a block diagram of an example client device 104 that may decompress and/or play a video, in accordance with example embodiments of the disclosure. The client device 104 may include one or more processor(s) 800, one or more input/output (I/O) interface(s) 802, one or more communication interface(s) 804, one or more storage interface(s) 806, and computer-readable media 810. The descriptions of the one or more processor(s) 800, the one or more input/output (I/O) interface(s) 802, the one or more communication interface(s) 804, the one or more storage interface(s) 806, and the computer-readable media 810 may be substantially similar to the descriptions of the one or more processor(s) 700, the one or more input/output (I/O) interface(s) 702, the one or more communication interface(s) 704, the one or more storage interface(s) 706, and the computer-readable media 710, respectively, of the video generation system(s) 110 of FIG. 7, and in the interest of brevity, will not be repeated here.

Several functional blocks having instruction, data stores, and so forth may be stored within the computer-readable media 810 and configured to execute on the processor(s) 800. The computer readable media 810 may have stored thereon a video storage handler 812, a format converter 814, a texture decompressor 816, a video data arranger 818, a resolution decompressor 820, and a video player 822. It will be appreciated that each of the functional blocks 812, 814, 816, 818, 820, 822, may have instructions stored thereon that when executed by the processor(s) 800 may enable various functions pertaining to the operations of the client device 104.

The instructions stored in the video storage handler 812, when executed by the processor(s) 800, may configure the client device 104 to access stored video, both compressed and/or uncompressed. In some cases, this video data may be embedded in other applications, such as a video game.

The instructions stored in the format converter 814, when executed by the processor(s) 800, may configure the client device 104 to convert formats of video and/or image data. For example, the video generation system(s) 110 may be configured to convert video and/or image data from a YCoCg format to an RGB format, or vice-versa. The video generation system(s) 110 may also be able to convert video and/or image data to or from other formats, such as RGB-A, PNG, other YCC formats, YUV, or the like.

The instructions stored in the texture decompressor 816, when executed by the processor(s) 800, may configure the client device 104 to reverse texture compression including, but not limited to, ETC1 and/or ETC2 texture decompression.

The instructions stored in the video data arranger 818, when executed by the processor(s) 800, may configure the client device 104 to rearrange video data that spans across frames of a video to data within a frame of the video. The client device 104 may be configured to reverse the interleaved data generated across frames of the video during video compression.

The instructions stored in the resolution decompressor 820, when executed by the processor(s) 800, may configure the client device 104 to ascribe resolution compressed video data, such as resolution compressed Co data and/or resolution compressed Cg data, to a grouping of pixels from which the resolution compressed data was derived.

The instructions stored in the video player 822, when executed by the processor(s) 800, may configure the client device 104 to play uncompressed video on the client device 104. The video player may play any suitable format of video, such as RGB formatted video.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
    identifying compressed video data corresponding to a video, the video having a plurality of pixels across a plurality of frames, wherein the video data is compressed across a plurality of frames;
    generating first video data by performing a texture decompression of the compressed video data, the first video data corresponding to individual attributes of pixels within individual frames of the plurality of frames of video;
    determining, based at least in part on the first video data, second video data corresponding to individual ones of the plurality of pixels;
    determining, based at least in part on the first video data, third video data corresponding to the individual ones of the plurality of pixels;
    determining, based at least in part on the first video data, fourth video data corresponding to the individual ones of the plurality of pixels; and generating uncompressed video data of the video by arranging the second video data, the third video data, and the fourth video data.

2. The method of claim 1, wherein the second video data corresponds to luminance (Y) data of the individual ones of the plurality of pixels, the third video data corresponds to chrominance-orange (Co) data of the individual ones of the plurality of pixels, and the fourth video data corresponds to chrominance-green (Cg) data corresponding to the individual ones of the plurality of pixels.

3. The method of claim 2, wherein generating uncompressed video data of the video further comprises determining red, green, blue (RGB) data corresponding to the video based at least in part on the Y data, the Co data, and the Cg data.

4. The method of claim 1, further comprising playing the video by displaying content associated with the uncompressed video data on a display.

5. The method of claim 1, wherein to determine the third video data corresponding to the individual ones of the plurality of pixels further comprises:
associating a chrominance-orange (Co) value corresponding to a block of pixels to each pixel of the block of pixels.

6. The method of claim 5, wherein the block of pixels comprises 2 pixels by 2 pixels, wherein the block of pixels have a corresponding Cg value and four Y values corresponding to each pixel of the block of pixels.

7. The method of claim 1, wherein generating first video data comprises performing an Ericsson Texture Decompression of the compressed video data.

8. The method of claim 1, wherein determining the second video data corresponding to individual ones of the plurality of pixels further comprises:
determining Y data triplets spanning three consecutive frames of the video, the Y data being contained in the Y data triplets.

9. A video system, comprising:
one or more processors; and
one or more computer-readable media storing computer-executable instructions that, when executed by the one or more processors, cause the one or more processors to:
identify a video that is to be compressed, the video including video data associated with a plurality of pixels across a plurality of frames of the video;
select a first block of pixels from the plurality of pixels from a first frame of the video;
compress at least a portion of a first video data corresponding to the first block of pixels in resolution to generate a first resolution compressed video data;
generate compressed video data by texture compression of the first resolution compressed video data and a second resolution compressed video data corresponding to a second block of pixels from a second frame; and
provide a compressed video, the compressed video including the compressed video data.

10. The video system of claim 9, wherein the compressed video data is further based at least in part on a third resolution compressed video data from a third block of pixels from a third frame.

11. The video system of claim 10, wherein the first resolution compressed video data includes first resolution compressed chrominance-green (Cg) data corresponding to the first frame, wherein the second resolution compressed video data includes second resolution compressed Cg data corresponding to the second frame, wherein the third resolution compressed video data includes third resolution compressed Cg data corresponding to the third frame, and wherein the computer-executable instructions further cause the one or more processors to:
generate a resolution compressed Cg triplet including the first resolution compressed Cg data, the second resolution compressed Cg data, and the third resolution compressed Cg data,
wherein the compressed video data includes a texture compression of the resolution compressed Cg triplet.

12. The video system of claim 10, wherein the first resolution compressed video data includes luminance (Y) data corresponding to each pixel of the first block of pixels from the first frame of the video.

13. The video system of claim 9, wherein the computer-executable instructions further cause the one or more processors to:
convert the first video data from a first format to the video data in a second format.

14. The video system of claim 13, wherein the first format is a red, green, and blue (RGB) format and the second format is a luminance, chrominance-orange, and chrominance-green (YCoCg) format.

15. The video system of claim 10, wherein the computer-executable instructions further cause the one or more processors to:
compress at least a second portion of a second video data corresponding to the second block of pixels in resolution to generate the second resolution compressed video data; and
compress at least a third portion of the second video data corresponding to the second block of pixels in resolution to generate a third resolution compressed video data, wherein the first block of pixels, the second block of pixels, and the third block of pixels are aligned across the first frame, the second frame, and the third frame.

16. A method comprising:
identifying a video that is to be compressed, the video including video data associated with a plurality of pixels across a plurality of frames of the video;
selecting a first block of pixels from the plurality of pixels from a first frame of the video;
compressing at least a portion of a first video data corresponding to the first block of pixels in resolution to generate a first resolution compressed video data;
generating compressed video data by texture compression of the first resolution compressed video data and a second resolution compressed video data corresponding to a second block of pixels from a second frame; and
providing a compressed video, the compressed video including the compressed video data.

17. The method of claim 16, further comprising:
converting the video data from a red, green, and blue (RGB) format to a luminance, chrominance-orange, and chrominance-green (YCoCg) format.

18. The method of claim 16, wherein generating the compressed video data is further based at least in part on a third resolution compressed video data from a third block of pixels from a third frame.

19. The method of claim 18, wherein the first resolution compressed video data includes first resolution compressed chrominance-orange (Co) data corresponding to the first frame, wherein the second resolution compressed video data includes second resolution compressed Co data corresponding to the second frame, wherein the third resolution compressed video data includes third resolution compressed Co data corresponding to the third frame, and wherein the method further comprises:

generating a resolution compressed Co triplet including the first resolution compressed Co data, the second resolution compressed Co data, and the third resolution compressed Co data, wherein the compressed video data includes a texture compression of the resolution compressed Co triplet.

20. The method of claim 18, wherein the first resolution compressed video data includes luminance (Y) data corresponding to each pixel of the first block of pixels from the first frame of the video.

\* \* \* \* \*